ગ2,980,713
Patented Apr. 18, 1961

2,980,713
16-METHYL-3α,17α-DIHYDROXY STEROIDS OF THE PREGNANE SERIES

John M. Chemerda, Metuchen, Edward W. Tristram, Cranford, David F. Hinkley, Plainfield, and Jan Ten Broeke, Watchung, N.J., assignors to Merck & Co., Inc., Rahway, N.J., a corporation of New Jersey No Drawing. Filed Sept. 5, 1958, Ser. No. 759,127

11 Claims. (Cl. 260—397.45)

This invention relates to novel steroid compounds and particularly to novel steroid compounds useful as intermediates in the synthesis of 16-methyl-17α-hydroxy-21-acyloxy-1,4,9(11)-pregnatriene-3,20-diones, and to processes for preparing these intermediates.

It has now been found that 16-methyl-17α-hydroxy-21-acyloxy-1,4,9(11)-pregnatriene-3,20-dione compounds can be synthesized by reactions indicated as follows:

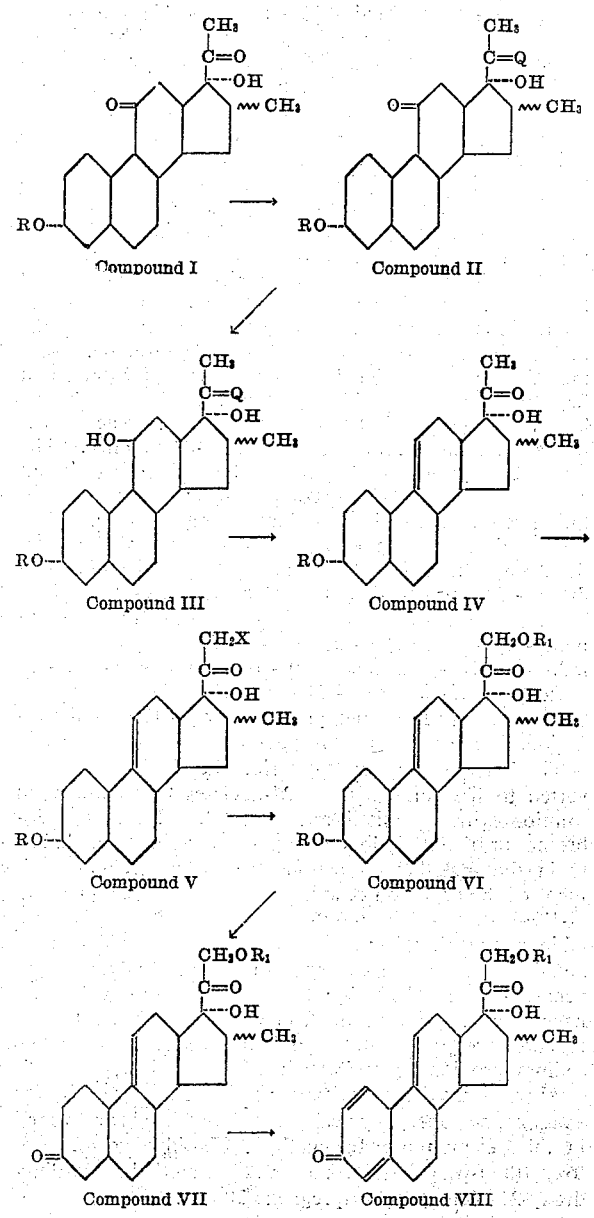

In the above formulae R is hydrogen or acyl, Q is a divalent radical of a nitrogenous ketone reagent, X is a halogen having an atomic weight between 70 and 140, $R_1$ is acyl. The reactions indicated are conducted as follows: A 3-oxygenated-16-methyl-17α-hydroxy-pregnane-11,20-dione Compound I) is reacted with a nitrogenous ketone reagent in a buffered medium to produce a 3-oxygenated-16-methyl-pregnane-11-one having attached to the C-20-position a divalent radical of a nitrogenous ketone reagent (Compound II). This latter compound is then reacted with an alkali metal borohydride to form the corresponding 3-oxygenated-16-methyl-11β,17α-dihydroxy pregnane, having attached to the C-20 position a divalent radical of a nitrogenous ketone reagent (Compound III). The latter compound is then contacted with a solution of a strong acid to produce a 3-oxygenated-16-methyl - 17α - hydroxy-9(11)-pregnene-20-one (Compound IV). This compound is then treated with bromine to form a 3-oxygenated 16-methyl-17α-hydroxy-21-bromo-9(11)-pregnene - 20 - one (Compound V), which may be converted to the corresponding 21-iodo compound by treatment with an alkali metal iodide. The latter 21-iodo or 21-bromo compound (Compound V) is then contacted with an alkali metal salt of a hydrocarbon carboxylic acid to produce a 3-oxygenated-16-methyl-17α-hydroxy - 21 - acyloxy-9(11)-pregnene-20-one (Compound VI). This compound is then contacted with an oxidizing agent to produce a 16-methyl-17α-hydroxy-21-acyloxy-9(11)-pregnene-3,20-dione Compound VII). This latter compound is then dehydrogenated to produce 16-methyl-17α-hydroxy-21-acyloxy - 1,4,9(11) - pregnatriene-3,20-dione (Compound VIII).

This invention is concerned with the intermediate nitrogenous ketone derivatives of 3-oxygenated-16-methyl-17α-hydroxy pregnane-11,20-dione (Compound 2) of the formula

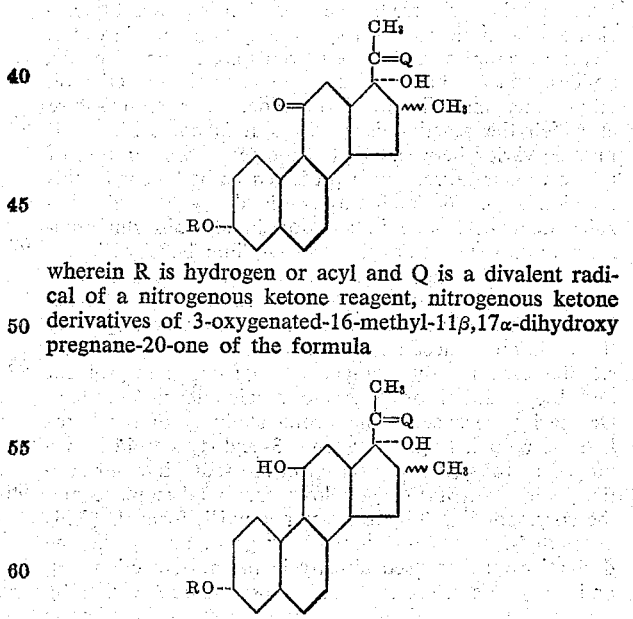

wherein R is hydrogen or acyl and Q is a divalent radical of a nitrogenous ketone reagent, nitrogenous ketone derivatives of 3-oxygenated-16-methyl-11β,17α-dihydroxy pregnane-20-one of the formula

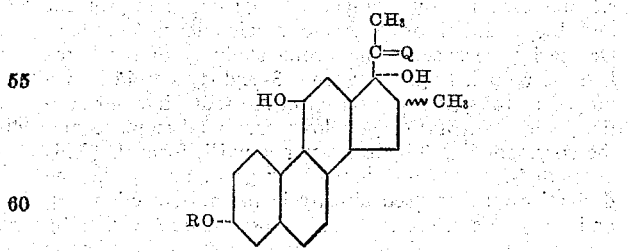

wherein R is a hydrogen or acyl and Q is a divalent radical of a nitrogenous ketone reagent, 3-oxygenated-16-methyl-17α-hydroxy-9(11)-pregnene-20-one (Compound IV), 3 - oxygenated - 16 - methyl-21-halo-17α-hydroxy-9(11)-pregnene-20-one (Compound V), 3-oxygenated-16-methyl-17α-hydroxy-21-acyloxy-9(11)-pregnene-20-one (Compound VI), 16-methyl-17α-hydroxy - 21 - acyloxy-9(11)-pregnene-3,20-dione (Compound VII), and with the process of preparing 16-methyl-17α-hydroxy-21-acyloxy-1,4,9-(11)-pregnatriene-3,20-dione (Compound VIII) from the 3-oxygenated-16-methyl - 17α - hydroxy pregnane-11,20-dione (Compound I).

The ketone derivative of 3-oxygenated-16-methyl-17α-hydroxy pregnane-11,20-dione is prepared by reacting a 3 - oxygenated - 16 - methyl - 17α - hydroxy pregnane-11,20-dione with a nitrogenous ketone reagent in a buffered medium. Typical examples of such 3-oxygenated-16 - methyl - 17α - hydroxy pregnane - 11,20 - dione compounds are 16α-methyl-3,17α-dihydroxy pregnane-11,20-dione, 16β - methyl - 3,17α - dihydroxy pregnane-11,20- dione and 16α-methyl-3-acetoxy-17α-hydroxy pregnane-11,20-dione. The nitrogenous ketone reagent is of the general formula $QH_2$, wherein Q is as defined above. Typical examples of suitable nitrogenous ketone reagents are hydroxylamine, semicarbazide, hydrazine and substituted hydrazines. The reaction is preferably carried out under anhydrous or substantially anhydrous conditions and in a solvent for the reactants. Suitable solvents are those which are nonreactive with the ketone reagent employed, such as alcohols, amides, nitriles and ethers as, for example, methanol, ethanol, acetonitrile, dimethylacetamide and dimethylformamide or mixtures thereof. The reaction temperature is not critical and may be between about 20 to 120° C., but preferably somewhat above room temperature in order to accelerate the formation of the ketone derivatives. Typical examples of 3-oxygenated-16-methyl-17α-hydroxy pregnane-11,20-dione derivatives which may be formed are 16α - methyl - 3,17α - dihydroxy - 20 - semicarbazido pregnane - 11 - one, 16α - methyl - 3 - acetoxy - 17α-hydroxy - 20 - semicarbazido pregnane - 11 - one, 16β-methyl - 3,17α - dihydroxy - 20 - semicarbazido pregnane - 11 - one and 16α - methyl - 3,17α - dihydroxy-20-oximino pregnane-11-one.

The 3-oxygenated-16-methyl-17α-hydroxy pregnane-11,20-dione ketone derivative is then reacted with an alkali metal borohydride to form the ketone derivative of 3-oxygenated-16-methyl-11β,17α-dihydroxy pregnane-20-one. The alkali metal borohydride may be either sodium borohydride or lithium borohydride, sodium borohydride being preferred. The reaction is preferably carried out in an inert solvent which may also contain water. Typical examples of suitable solvents are ethers, alcohols, amides, and the like as, for example, methanol, ethanol, ethyl ether and dimethylformamide. The temperature at which the reaction is carried out is not critical. It may be varied between 0° and the reflux temperature of the solvent mixture. In a preferred embodiment of this reaction step, 16α-methyl-3,17α-dihydroxy-20-semicarbazido pregnane-11-one in solution in aqueous dimethylformamide is treated with excess sodium borohydride at about 25° C. for a period of about 3 hours to form 16α-methyl-3,11β,17α-trihydroxy-21-semicarbazido pregnane-20-one. The excess reducing agent is then destroyed by the addition of acetic acid and the formed 11β-hydroxy steroid recovered by removal of a portion of the solvent and the addition of water to precipitate the product. Ordinarily, because of the strong akalinity of the borohydride reducing agents, when a 3-acyloxy steroid is employed as the starting material in the reduction, substantial hydrolysis of the 3-acyloxy group takes place and the corresponding 3-hydroxy compound is formed. This 16-methyl-3,11β,17α-trihydroxy pregnane-20-one ketone derivative may be used directly in the next reaction step or it may be converted to the corresponding 3-acylate by treatment with a suitable acylating agent, such as acetic anhydride, acetyl chloride, and the like. Typical examples of the 3-oxygenated-16-methyl-11β,17α-dihydroxy pregnane 20 - one derivatives formed in this reduction step are 16α-methyl-3,11,17α-trihydroxy-20-semicarbazido pregnane, 16β - methyl - 3,11β,17α - trihydroxy - 20- semicarbazido pregnane, 16 - methyl - 11β,17α - dihydroxy - 3 - acetoxy - 20 - semicarbazido pregnane, and 16α - methyl - 3,11β,17α - trihydroxy - 20 - oximino pregnane.

The 3 - oxygenated - 16 - methyl - 11β,17α - dihydroxy pregnane 20-one is treated with a solution of a strong acid to form a 3-oxygenated-16-methyl-17α-hydroxy-9(11)-pregnene-20-one. The acid employed in the reaction may be any strong mineral acid, typical examples being hydrochloric acid, hydrobromic acid, sulfuric acid and phosphoric acid. The reaction may be effected in a homogeneous system or, as in a preferred embodiment, in a two-phase system wherein the steroid is, for the most part, dissolved in the organic phase and the acid is present as an aqueous solution. The reaction temperature is not critical, although in order to effect more rapid dehydration it is preferred to maintain the reaction at the reflux temperature of the mixture. A preferred method for carrying out the reaction is to dissolve the steroid in an inert solvent, e.g. an aromatic hydrocarbon or a chlorinated hydrocarbon such as benzene or chloroform and treating the thus formed steroid solution with an aqueous solution of hydrochloric acid to effect hydrolysis of the nitrogenous ketone derivative and concurrent dehydration of the 11β-hydroxyl group. Typical examples of products which may be formed in this reaction are 16α-methyl-3,17α-dihydroxy-9(11)-pregnene-20 - one, 16α - methyl - 3 - acetoxy - 17α - hydroxy-9(11) - pregnene - 20 - one, 16β - methyl - 3,17α - dihydroxy - 9(11) - pregnene - 20 - one and 16β - methyl-3-acetoxy-17α-hydroxy-9(11)-pregnene-20-one.

The 3 - oxygenated - 16 - methyl - 17α - hydroxy-9(11)-pregnene-20-one was then reacted with bromine to produce 3-oxygenated-16-methyl-17α-hydroxy-21-bromo-9(11)-pregnene-20-one which may then be treated with an alkali metal acylate to form the corresponding 3-oxygenated - 21 - acyloxy - 16 - methyl - 17α - hydroxy-9(11)-pregnene-20-one. The bromination reaction is conducted in an organic solution using a ratio of approximately one mole of steroid to one mole of bromine. Solvents which may be employed in this reaction are any inert solvents or the steroid compound which was dissolved bromine. Thus a lower alkanol, a chlorinated hydrocarbon, acetic acid or mixtures of these may be used. It is preferred to catalize the bromination by the addition of a trace amount of hydrogen bromide. Bromination may be effected at temperatures of from about 25° up to about the boiling point of the solvent, although a temperature of about 50° is preferred, the reaction being substantially complete in about 40 minutes. The crude 21-bromo compound may be converted without purification to the 21-iodo compound by treatment in solution with an alkali metal iodide, for example, potassium iodide. Examples of the 21-halo compounds produced by these procedures are 16α-methyl-3,17α-dihydroxy - 21 - bromo - 9(11) - pregnene - 20 - one, 16β-methyl - 3,17α - dihydroxy - 21 - bromo - 9(11) - pregnene - 20 - one, 16α - methyl - 3,17α - dihydroxy - 21-iodo - 9(11) - pregnene - 20 - one, 16α - methyl - 3-acetoxy - 17α - hydroxy - 21 - bromo - 9(11) - pregnene-20 - one and 16α - methyl - 3 -acetoxy - 17α - hydroxy-21-iodo-9(11)-pregnene-20-one.

The 21-halo compounds described hereinabove are converted to the corresponding 21-acylates by treatment in solution with an alkali metal acylate. Either the 21-bromo or the 21-iodo compounds may be used directly in the metathesis reaction. In a preferred embodiment of the acylation reaction the 3-oxygenated-16-methyl-17α-hydroxy-21-bromo-9(11)-pregnene-20-one is heated in an organic solvent with an alkali metal iodide and an alkali metal acetate to form the corresponding 3-oxygenated-16-methyl-17α-hydroxy-21-acyloxy- 9(11) - pregnene-20-one. Typical alkali metal lower acylates for the reaction are potassium or sodium acetate, potassium or sodium propionate, and the like. The solvent which is employed may be a lower aliphatic ketone solvent, for example, acetone. Typical examples of products formed in this reaction are 16α-methyl-3,17α-dihydroxy-21-acetoxy-9(11)-pregnene-20-one and 16β-methyl-3,17α-dihydroxy-21-acetoxy-9(11)-pregnene-20-one.

The 16-methyl-3,17α-dihydroxy-21-acyloxy-9(11)-pregnene-20-one is then treated with a strong oxidizing agent to produce 16-methyl-17α-hydroxy-21-acyloxy-9(11)-pregnene-3,20-dione. Oxidizing agents employed in the reaction are preferably hexavalent compounds of chromium either in acid or alkaline solutions. Typical examples of oxidizing agents which may be successfully used are chromium trioxide in pyridine solution, chromium trioxide in acetic acid and sodium dichromate in acetic acid. Although pyridine and acetic acid are suitable solvents, other inert organic solvents or mixtures may be employed. When the preferred oxidizing agent, potassium dichromate and acetic acid, is used the reaction is essentially complete in about 30 minutes although longer times, up to about 3 hours are generally employed to insure complete oxidation of the 3-hydroxy group. Following the oxidation the reaction mixture is diluted with several volumes of water, whereupon the product precipitates and may be recovered by filtration. Typical examples of the 16-methyl-17α-hydroxy-21-acyloxy-9(11)-pregnene-3,20-dione compounds obtained in this step are 16α-methyl-17α-hydroxy-21-acetoxy-9(11)-pregnene-3,20-dione and 16β-methyl-17α-hydroxy-21-acetoxy-9(11)-pregnene-3,20-dione. The 16-methyl-17α-hydroxy-21-acyloxy-9(11)-pregnene-3,20-dione is then dehydrogenated by one of the following procedures: (1) Bromination followed by dehydrobromination. (2) Microbial dehydrogenation.

In the first of these procedures the 16-methyl-17α-hydroxy-21-acyloxy-9(11)-pregnene-3,20-dione is contacted with bromine to produce either the 16-methyl-17α-hydroxy-21-acyloxy-4-bromo-9(11)-pregnene-3,20-dione or the 16-methyl-17α-hydroxyl-21-acyloxy-2,4-dibromo-9(11)-pregnene-3,20-dione. The brominated compounds are then contacted with a solution of a base to form 16-methyl-17α-hydroxy-21-acyloxy-4,9(11)-pregnadiene-3,20-dione or 16-methyl-17α-hydroxy-21-acyloxy-1,4,9(11)-pregnatriene-3,20-dione. Although any base may be employed, it is preferred to use a tertiary amine such as dimethylaniline, cillidine or a mixture of one of these bases with dimethylformamide.

According to the second of these procedures, the 16-methyl-17α-hydroxy-21-acyloxy-9(11)-pregnene-3,20-dione is contacted with a growing culture of a microorganism capable of effecting dehydrogenation in the A-ring of the steroid e.g. *Bacillus sphaericus*. This can be effected by adding the steroid compound as a solid, or as a solution in a solvent such as dimethylformamide, under sterile conditions to a culture of the microorganism in a nutrient medium and agitating the resulting mixture, thereby bringing about growth of the microorganism and dehydrogenation of the steroid compound.

The following examples are included for purposes of illustration and not of limitation.

EXAMPLE 1

*16α-methyl-3α,17α-dihydroxy-20-semicarbazido pregnane-11-one*

A mixture was prepared including 10 g. of 16α-methyl-3α,17α-dihydroxy pregnane-11,20-dione, 10 g. of semicarbazide, 3.33 g. semicarbazide hydrochloride, 50 ml. of dimethylformamide and 100 ml. of methanol. The reaction mixture was stirred at the reflux temperature under nitrogen for four hours and then allowed to stir at 25° C. for an additional 2 hours to promote crystallization of the product. To the reaction mixture was then added 300 ml. of water over the course of one hour, to effect complete precipitation of the product. The slurry of crystalline product was stirred in an ice bath for two hours and filtered. The recovered product was washed well on the filter with water until free of chloride ion (determined by testing successive washings with silver nitrate solution) and dried under vacuum at 55° C. Further purification of the product by crystallization with methanol and water gave a product melting at 227–245° C.;

$$\lambda_{max.}^{MeOH} \ 2290°A$$

E% 347.

In a manner similar to the method described above, the corresponding 16β-methyl-3α,17α-dihydroxy-20-semicarbazido pregnane-11-one is prepared.

EXAMPLE 2

*16α-methyl-3α,11β,17α-trihydroxy-20-semicarbazido pregnane*

To a solution of 10 g. of 16α-methyl-3α,17α-dihydroxy-20-semicarbazido pregnane-11-one in 200 ml. of tetrahydrofuran was added a solution of 3.0 g. sodium borohydride in 60 ml. of water with vigorous agitation at about 25° C. Almost all of the steroid dissolved. After stirring at 25° C. for 3 hours, the excess reducing agent was destroyed by the addition of 16% aqueous acetic acid until the solution was slightly acid (approximately pH 6). The reaction mixture was then concentrated under vacuum during which time 400 ml. of water was introduced into the system, thereby effecting crystallization of the product. When approximately 200 ml. of distillate had been collected, the crystalline slurry was cooled in an ice bath for two hours to effect complete precipitation of the product. The product was then filtered, washed with water and dried under vacuum. Further crystallization of a sample of the product from methanol and water gave material melting at 244–245° C., $\lambda_{max}$. 2280, E% 343. A sample of 16β-methyl-3α,11β,17α-trihydroxy-20-semicarbazido pregnane is prepared in accordance with the above procedure.

EXAMPLE 3

*16α-methyl-3α,17α-dihydroxy-9(11)-pregnene-20-one*

A mixture of 10 g. of 16α-methyl-3α,11β,17α-trihydroxy-20-semicarbazido pregnane 60 ml. of benzene, 40 ml. of concentrated hydrochloric acid and 80 ml. of water was prepared and stirred at the reflux temperature for a period of about 4 hours. The mixture was then cooled, and diluted with 120 ml. of chloroform. The layers of the two-phase system were then separated, the organic layer containing the product was washed with water and then dried over sodium sulfate. The washed and dried extract was then concentrated to dryness under vacuum to yield a glassy residue comprising the product. The residue was dissolved in 80 ml. of hot methanol and diluted with 40 ml. of warm (60° C.) water to induce crystallization of the product. The aqueous methanol solution was then cooled and the product began to crystallize. The solution was then maintained at about 5 to 10° C. for about 4 hours to completely crystallize the product. The product was recovered by filtration and washed with 50% aqueous methanol and dried under vacuum, M.P. 176–178° C. A sample recrystallized from methanol-water melted at 179–180° C.

In similar manner to the above procedure and employing 16β-methyl-3α,11β,17α-trihydroxy-20-semicarbazido pregnane as the steroid starting material, the corresponding 16β-methyl-3α,17α-dihydroxy-9(11)-pregnene-20-one is formed.

EXAMPLE 4

*16α-methyl-3α,17α-dihydroxy-21-bromo-9(11)-pregnene-20-one*

To a solution of 10 g. of 16α-methyl-3α,17α-dihydroxy-9(11)-pregnene-20-one in 200 ml. of chloroform, heated to 47° C., a solution of one M hydrogen bromide in methanol was added with stirring. To the stirred solution was added 31.5 ml. of 1:20 methanol-chloroform solution of bromine (1 M) of a period of about 40 minutes while maintaining the temperature at 46–48° C. After stirring an additional 5 minutes, the mixture was allowed to cool to room temperature, 60 ml. of saturated aqueous sodium bicarbonate solution was added and the mixture stirred for another 5 minutes. The organic layer containing the 21-bromo steroid product, was separated and the aqueous layer extracted once with 20 ml. of chloroform. The two chloroform extracts were combined and dried over sodium carbonate. The dried chloroform extract was then concentrated under vacuum to dryness, giving a gummy residue. The gummy residue was dissolved in 10 ml. of acetone from which crystalline 16α-methyl-3α,17α-dihydroxy-21-bromo-9(11) - pregnene-20-one was attained. This product was satisfactory for use without further purification.

Employing the above described procedure and using 16β-methyl-3α,17α-dihydroxy-9(11)-pregnene-20-one as the starting material the corresponding 16β-methyl-3α,17α-dihydroxy-21-bromo-9(11)-pregnene-20-one is formed.

EXAMPLE 5

16α-methyl-3α,17α-dihydroxy-21-acetoxy-9(11)-pregnene-20-one

A mixture of the following materials was prepared:

10 g. of 16α-methyl-3α,17α-dihydroxy-21-bromo-9(11)-pregnene-20-one
10 g. of potassium acetate
8 g. of potassium iodide
0.1 ml. of acetic acid
200 ml. of acetone The resulting slurry was heated at the reflux temperature of the mixture for a period of about 16 hours with stirring, during which time the 21-bromo group was replaced with iodide to form 16α-methyl-3α,17α-dihydroxy-21-iodo-9(11)-pregnene-20-one and, in turn, the 21-iodo was replaced with acetate to form 16α-methyl-3α,17α-dihydroxy-21-acetoxy-9(11)-pregnene-20-one. The hot mixture was filtered to remove the insoluble inorganic salts and the filtered cake washed with two 20 ml. portions of hot acetone to dissolve any occluded steriod. To the acetone filtrate containing the product was added an equal volume of water which effected precipitation of the product. After cooling for about 16 hours to effect complete precipitation of the crystalline product, the crystals were recovered by filtration, washed with 20 ml. aqueous acetone and dried under vacuum: M.P. 221–226° C. A sample recrystallized from ethyl acetate melted at 224–229° C.

Employing the above described procedure and utilizing 16β-methyl-3α,17α-dihydroxy-21-bromo-9(11)-pregnene-20-one as the steroid starting material, the corresponding 16β-methyl-3α,17α-dihydroxy-21-acetoxy-9(11)-pregnene-20-one is formed.

EXAMPLE 6

16α-methyl-17α-hydroxy-21-acetoxy-9(11)-pregnene-3,20-dione

A solution of 10 g. of 16α-methyl-3α,17α-dihydroxy-21-acetoxy-9(11)-pregnene-20-one in 300 ml. of acetic acid and a solution of 3.07 g. of sodium dichromate dihydrate in 100 ml. of acetic acid were adjusted to 25° C. and mixed together all at once. The reaction mixture was maintained at 25–27° C. for about 2 hours and then diluted with 1600 ml. of water. After cooling in an ice bath for 30 minutes, the reaction mixture containing the precipitated product was filtered and the product washed on the filter with water until the washings were neutral. The product was then dried and chromatographed on acid-washed alumina, the product being obtained in the eluate comprises a 50–50 mixture of chloroform and ether. After removal of the solvent from the product containing eluate, the material was recrystallized from methanol, M.P. 221–224° C. $[\alpha]_D^{25°}+38(CHCl_3)$.

Employing the same procedure and utilizing as the steroid starting material 16β-methyl-3α,17α-dihydroxy-21-acetoxy-9(11)-pregnene-20-one as starting material, the corresponding 16β-methyl-17α-hydroxy-21-acetoxy-9(11)-pregnene-20-one is formed.

EXAMPLE 7

16α-methyl-17α-hydroxy-21-acetoxy-1,4,9(11)-pregnatriene-3,20-dione

A. BROMINATION

A solution of 5.0 g. of 16α-methyl-17α-hydroxy-21-acetoxy-9(11)-pregnene-3,20-dione in 10 ml. of acetic acid and 100 ml. of chloroform was prepared and cooled to −5° C. and 1.0 ml. of a solution of 1.0 in hydrogen bromide and acetic acid was added. A solution of 13.1 ml. of 1.94 M bromine in acetic acid was added dropwise during one hour, maintaining the temperature at −5 to −8° C. The reaction mixture was stirred an additional 30 minutes at −5° C. and 2.2 g. of sodium acetate in 9.0 ml. of water was added all at once to neutralize the acid. The excess bromine was then destroyed with aqueous sodium bisulfite solution. The reaction mixture was then concentrated under vacuum to 25 ml., whereupon the product separated as an oil. The addition of 25 ml. of acetic acid effected crystallization of the product. About 100 ml. of water was then added slowly over a period of about 30 minutes to completely precipitate the product and the mixture cooled in an ice bath for an hour. The crystalline 2,4-dibromo-16α-methyl-17α-hydroxy-21-acetoxy-9(11)-pregnene-3,20-dione was filtered, washed with water and dried under vacuum at 35° C. M.P. 196° C. with decomposition $$[\alpha]_D^{CHCl_3}+38.8°$$

In similar manner and using 16b-methyl-17α-hydroxy-21-acetoxy-9(11)-pregnene-3,20-dione as the steroid starting material the corresponding 2,4-dibromo-16β-methyl-17α-hydroxy-21-acetoxy-9(11)-pregnene-3,20-dione is formed.

B. DEHYDROBROMINATION

To a solution of 5 g. of the above mentioned dibromo steroid in 25 ml. of dimethylformamide was added 1 g. of sodium bromide. Dimethylaniline (5 ml.) was added and the reaction mixture heated to 135° C. After heating at 135° C. for 2½ hours, the entire mixture was cooled to 30° C. and added slowly into a well-stirred solution containing 3.0 ml. of concentrated hydrochloric acid in 97 ml. of water. Another 30 ml. of water was added to the mixture and the slurry of crystalline production was maintained at 0.5° C. for about an hour and a half. The product was recovered by filtration and washed with dimethylformamide, concentrated hydrochloric acid, water and dried overnight under vacuum. The crude product thus obtained was chromatographed over 105 g. of acid-washed aluminum in a column prepared in acetone and then displaced with a solution of one part of chloroform and three parts of ether. Approximately 100 ml. portions of eluate were successively collected, the desired product appearing mainly in portions 18 through 39. The product was recovered from these combined fractions by first removing the solvent and then stirring the residue for 3 hours at room temperature in 11.0 ml. of ether and 0.3 ml. of water. The crystalline 16α-methyl-17α-hydroxy-21-acetoxy-1,4,9(11)-pregnatriene-3,20-dione was filtered, washed with ether and dried under vacuum, M.P. 195–204° C.

In similar manner, and using 2,4-dibromo-16β-methyl-17α-hydroxy-21-acetoxy-9(11)-pregnene-3,20-dione as starting material, the corresponding 16β-methyl-17α-hydroxy-21-acetoxy-1,4,9(11)-pregnatriene-3,20-dione is formed.

EXAMPLE 8

*16α-methyl-17α-hydroxy-21-acetoxy-4,9(11)-pregnadiene-3,20-dione*

A. BROMINATION

A solution of 10 g. of 16α-methyl-17α-hydroxy-21-acetoxy-9(11)-pregnene-3,20-dione in 14.5 ml. of acetic acid and 150 ml. of chloroform was cooled to −55° C. and 1 ml. of 1 M hydrogen bromide in acetic acid was added. A solution of 23.2 ml. of an acetic acid solution, 1.07 M in bromine and 1.0 M in hydrogen bromide was added over a period of about 2 hours while maintaining the temperature at −55° C. to −50° C. The solution was stirred for an additional hour at −55° C. and 4.15 g. of sodium acetate dissolved in 30 ml. of water was added with vigorous agitation. The reaction mixture was then concentrated under vacuum, diluted with water to precipitate the product, and maintained at 0–5° for one hour. The white precipitated product, 16-methyl-4-bromo-17α-hydroxy-21-acetoxy-9(11)-pregnene-3,20-dione, was filtered, washed with water, and dried under vacuum at 35° C. M.P. 215° with decomposition

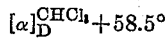

$[\alpha]_D^{CHCl_3} + 58.5°$

B. DEHYDROBROMINATION

A mixture was prepared by adding together 4.83 g. of the above noted 4-bromo steroid, 4.83 g. of sodium sulfate, 1.65 of semicarbazide, 16 ml. of dimethylformamide and 39 ml. of chloroform. The mixture was stirred at 15–20° C. for 2 hours and then concentrated under vacuum while 100 ml. of water was introduced into the flask. After cooling the mixture at 0–5° for 2 hours the product, 16α-methyl-3-semicarbazido-17α-hydroxy-21-acetoxy-4,9(11)-pregnadiene-20-one, was recovered by filtration, washed with water, and dried under vacuum.

The semicarbazone product prepared according to the above procedure is converted to 16α-methyl-17α-hydroxy-21-acetoxy-4,9(11)-pregnadiene-3,20-dione by the following procedure: A mixture was prepared by adding together 4 g. of the above semicarbazone, 13.5 ml. of dimethylformamide, 32 ml. chloroform, 17.5 ml. water, and 4.05 ml. concentrated hydrochloric acid in 26 ml. of water. The reaction mixture was heated to reflux temperature for 1½ hours with vigorous stirring to form 16α-methyl-17α-hydroxy-21-acetoxy-4,9(11)-pregnadiene-3,20-dione. Following the heating period the reaction mixture was cooled and the organic layer containing the product was separated. The aqueous layer was further extracted with three 5 ml. portions of chloroform. All of the organic extracts were combined and stirred vigorously with a solution of 3.62 ml. of concentrated hydrochloric acid in 35.5 ml. of water at the reflux temperature for about 30 minutes to increase the yield of product. The reaction mixture was then cooled, the organic layer containing the product was separated and the aqueous layer further extracted with three 5 ml. portions of chloroform. The chloroform extracts were combined, washed with aqueous sodium bicarbonate solution and water. The combined chloroform extracts were then dried and subsequently evaporated to dryness in vacuo to yield crystalline 16α-methyl-17α-hydroxy-21-acetoxy-4,9(11)-pregnadiene-3,20-dione.

In similar manner and using 16β-methyl-17α-hydroxy-21-acetoxy-9(11)-pregnene-3,20-dione as the steroid starting material the corresponding 16β-methyl-17α-hydroxy-21-acetoxy-4,9(11)-pregnadiene-3,20-dione is formed.

The 3-oxygenated-16-methyl-17α-hydroxy-pregnane-11,20-dione starting materials are prepared according to procedures given below. The 3-oxygenated-16α-methyl-17α-hydroxy-pregnane-11,20-dione compounds are prepared in accordance with the following procedures:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 16-pregnene-3α-ol-11,20-dione 3-acetate in 175 ml. of ether. A white granular solid separates during this addition. The resulting mixture is heated under gentle reflux for two hours after while the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. of pyridine and the acetylated product is purified by chromatography on acid-washed alumina followed by crystallization from petroleum ether to give approximately 1.5 g. of substantially pure 16α-methyl-pregnene-3α-ol-11,20-dione 3-acetate.

To a solution of 0.8 g. of 16α-methyl-pregnane-3α-ol-11,20-dione 3-acetate in 40 ml. of methanol is added 1.5 ml. of concentrated aqueous hydrochloric acid, and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 16a-methyl-pregnane-3α-ol-11,20-dione.

A solution of 22 g. of 16α-methyl-pregnane-3α-ol-11,20-dione 21-acetate and 1 g. of p-toluene-sulfonic acid in 250 ml. of acetic anhydride is heated at a reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is absorbed on 660 g. of acid-washed alumina; the alumina adsorbate is then washed with 2 liters of petroleum ether. The adsorbate is then eluted with 85:15 petroleum-ether mixture, and the first four liters of eluate is collected, and evaporated to dryness in vacuo to give a mixture of enol acetates containing 16α-methyl-17(20)-pregnene-3α,20-diol-11-one 3,20-diacetate. This mixture of enolates, weighing approximately 14 g., is dissolved in 50 ml. of benzene and treated with an excess of per-benzoic acid over a 16-hour period. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 16α-methyl-17α,20-epoxy-pregnane-3α,20-diol-11-one 3,20-diacetate. The latter material is then dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 16α-methyl-pregnane-3α,17α-diol-11,20-dione.

The 16α-methyl-pregnane-3α,17α-diol-11,20-dione is conveniently converted to the corresponding 3-acylate, for example, the acetate by contacting a solution of 16α-methyl-pregnane-3α,17α-diol-11,20-dione in pyridine with acetyl chloride.

The 3-oxygenated-16β-methyl-17α-hydroxy pregnane-11,20-dione starting materials can be prepared in accordance with the following process:

To a solution of 3α-acetoxy-16-pregnene-11,20-dione in a mixture of tetrahydrofuran and ethyl ether is added diazomethane to produce 3α-acetoxy-16α,17α-methyleneazopregnane-11,20-dione (M.P. 186–190° C.) which precipitated from solution. Heating this compound at about 180° C. in vacuo produces 3α-acetoxy-16-methyl-16-pregnene-11,20-dione (M.P. 165–167° C.) which upon reaction with hydrogen peroxide in the presence of sodium hydroxide in methanol solution for 18 hours at room temperature affords 16α,17α-epoxy-3α-hydroxy-16β-methyl-pregnane-11,20-dione (M.P. 178–180° C.). When this compound is treated with perchloric acid in aqueous dioxane at 25–30° C. for 65 hours and the resulting reaction mixture is diluted with water a mixture of 3α,17α-dihydroxy - 16-methyl-15-pregnene-11,20-dione and 3α,17α-dihydroxy-16-methylene-pregnene (M.P. 158–167° C.) is precipitated and recovered by filtration. Reduction of this mixture with hydrogen in methanol in the presence of palladium-calcium carbonate catalyst affords a mixture of 3α,17α-dihydroxy-16α-methyl-pregnane-11,20-dione and 3α,17α-dihydroxy-16β-methyl-pregnane-11,20-dione sintering at 150° C. This mixture of acetates is conveniently separated by chromatography on neutral aluminum and elution with chloroform-benzene (1 to 1) and benzene yields 16α-methyl-3α,17α-dihydroxy pregnane-11,20-dione. This 3α-hydroxy compound is conveniently converted to the corresponding 3α-ester by treatment with an acylating agent, e.g. acetyl chloride and pyridine to form 16β-methyl-3α-acetoxy-17α-hydroxy pregnane-11,20-dione.

The 16 - methyl-17α-hydroxy - 21 - acyloxy - 1,4,9(11)-pregnatriene-3,20-dione compounds prepared by the process of the present invention have utility as intermediates in the preparation of biologically active 16-methyl steroids. More specifically, these new products may be used in the preparation of 16α-methyl-9α-fluoro-11β,17α,21-trihydroxy-1,4-pregnadiene-3,20-dione and 16β-methyl-9α-fluoro-11β,17α,21-trihydroxy-1,4-pregnadiene - 3,20-dione. These compounds possess unusually high anti-inflammatory and gluco-corticoid activity and are useful in the treatment of rheumatoid arthritis.

The 16 - methyl-17α-hydroxy - 21 - acyloxy - 1,4,9(11)-pregnatriene-3,20-diones which are prepared by the process of the present invention may be converted to the active anti-arthritic compounds by application of the following procedure: The 16-methyl-17α-hydroxy-21-acyloxy-1,4,9(11)-pregnatriene-3,20-diones, e.g. 16α-methyl-17α-hydroxy - 21 - acyloxy-1,4,9(11)-pregnatriene - 3,20-dione or β-methyl-17α-hydroxy - 21 - acyloxy - 1,4,9(11)-pregnatriene-3,20-dione are treated with hypobromous acid to produce 9α-bromo-16-methyl-17α-hydroxy-11β,17α-dihydroxy-21-acetoxy - 1,4 - pregnadiene - 3,20-diones which are then reacted with potassium acetate in ethanol to produce 16-methyl-9(11)-oxido-17α-hydroxy-21-acetoxy-1,4-pregnadiene-3,20-dione. These 9(11)-oxides are then reacted with hydrogen fluoride and tetrahydrofuran to produce 16-methyl-9α-fluoro-11β,17α - dihydroxy - 21-acetoxy-1,4-pregnadiene-3,20-dione, e.g. 16α-methyl-9α-fluoro-11β,17α-dihydroxy-21-acetoxy - 1,4 - pregnadiene-3,20-dione and 16β-methyl-9α-fluoro-11β,17α-dihydroxy-21-acetoxy-1,4-pregnadiene-3,20-dione.

Any departure from the above description which conforms to the present invention is intended to be included within the scope of the impended claims.

We claim:
1. Compounds having the general formula

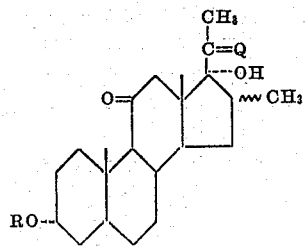

wherein R is a member selected from the group consisting of hydrogen and an acyl radical of a lower aliphatic carboxylic acid and Q is a divalent radical of a nitrogenous ketone reagent.

2. Compounds having the general formula

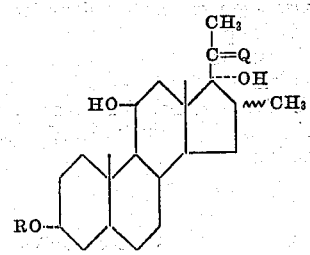

wherein R is a member selected from the group consisting of hydrogen and an acyl radical of a lower aliphatic carboxylic acid and Q is a divalent radical of a nitrogenous ketone reagent.

3. Compounds having the general formula

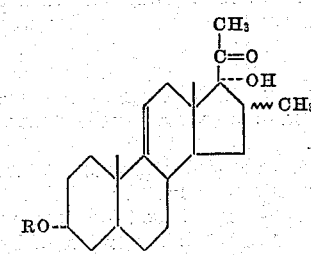

wherein R is a member selected from the group consisting of hydrogen and an acyl radical of a lower aliphatic carboxylic acid.

4. Compounds having the general formula

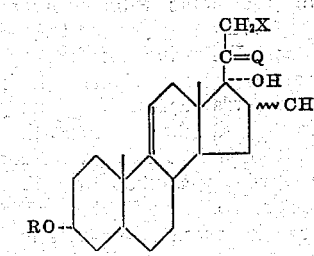

wherein R is a member selected from the group consisting of hydrogen and an acyl radical of a lower aliphatic carboxylic acid and X is a halogen having an atomic weight between 70 and 140.

5. Compounds having the general formula

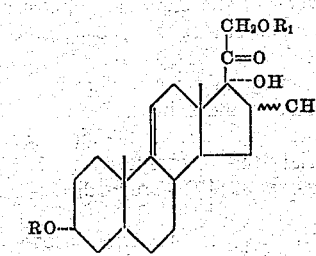

wherein R is a member selected from the group consisting of hydrogen and an acyl radical of a lower aliphatic carboxylic acid and $R_1$ is an acyl radical of a lower aliphatic carboxylic acid.

6. 16α-methyl-3α,17α-dihydroxy-20-semicarbazido pregnane-11-one.

7. 16α-methyl-3α,11β,17α-trihydroxy-20 - semicarbazido pregnane.

8. 16α - methyl-3α,17α-dihydroxy-9(11)-pregnene - 20-one.

9. 16α-methyl-3α,17α-dihydroxy-21-bromo-9(11)-pregnene-20-one.

10. 16α-methyl-3α,17α-dihydroxy-21-iodo-9(11) - pregnene-20-one.

11. 16α-methyl-3α,17α - dihydroxy - 21 - acetoxy-9(11)-pregnene-20-one.

References Cited in the file of this patent

UNITED STATES PATENTS

| | | |
|---|---|---|
| 2,640,839 | Wendler et al. | June 2, 1953 |
| 2,777,843 | Chemerda et al. | Jan. 15, 1957 |
| 2,789,989 | Julian et al. | Apr. 23, 1957 |
| 2,811,537 | Krsek et al. | Oct. 29, 1957 |
| 2,837,541 | Hirschmann et al. | June 3, 1958 |
| 2,838,499 | Spero et al. | June 10, 1958 |
| 2,849,463 | Joly et al. | Aug. 26, 1958 |
| 2,854,383 | Herzog | Sept. 30, 1958 |

OTHER REFERENCES

Oliveto et al.: 80, J.A.C.S., 4431 (1958).